(12) United States Patent
Zhou et al.

(10) Patent No.: US 6,777,079 B2
(45) Date of Patent: Aug. 17, 2004

(54) CROSSLINKED PRESSURE SENSITIVE ADHESIVE COMPOSITIONS, AND ADHESIVE ARTICLES BASED THEREON, USEFUL IN HIGH TEMPERATURE APPLICATIONS

(75) Inventors: Zhiming Zhou, Woodbury, MN (US); Lori P. Engle, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/998,935

(22) Filed: Nov. 30, 2001

(65) Prior Publication Data

US 2002/0132111 A1 Sep. 19, 2002

Related U.S. Application Data

(60) Provisional application No. 60/250,418, filed on Dec. 1, 2000.

(51) Int. Cl.[7] .................................................. B32B 7/12
(52) U.S. Cl. ............................... 428/355 AC; 428/343; 528/363; 528/367; 427/154; 427/155; 427/156
(58) Field of Search .......................... 428/343, 355 AC, 428/355 R, 355 RA, 355 EN; 427/154, 155, 156; 528/363, 367

(56) References Cited

U.S. PATENT DOCUMENTS

| 4,418,120 A | | 11/1983 | Kealy et al. |
|---|---|---|---|
| 5,604,034 A | | 2/1997 | Matsuda |
| 5,648,425 A | * | 7/1997 | Everaerts et al. ............ 525/100 |
| 5,800,919 A | | 9/1998 | Peacock et al. |
| 5,861,211 A | | 1/1999 | Thakkar et al. |
| 5,882,771 A | * | 3/1999 | Klein et al. .................. 428/161 |
| 5,914,186 A | * | 6/1999 | Yau et al. ..................... 428/327 |
| 6,048,431 A | | 4/2000 | Clements et al. |
| 6,054,213 A | | 4/2000 | Peacock et al. |
| 6,337,128 B1 | * | 1/2002 | Oji et al. .................. 428/317.3 |
| 6,441,092 B1 | * | 8/2002 | Gieselman ................... 525/191 |
| 6,441,114 B1 | * | 8/2002 | Peloquin et al. ......... 526/307.2 |

FOREIGN PATENT DOCUMENTS

| JP | 3-281586 | | 3/1990 | |
|---|---|---|---|---|
| JP | 02178379 A | * | 7/1990 | .......... C09J/133/00 |
| JP | 03281585 A | * | 12/1991 | .......... C09J/133/04 |
| WO | WO 93/13148 | | 7/1993 | |
| WO | WO 97/31076 | | 8/1997 | |
| WO | WO 97/31077 | | 8/1997 | |

OTHER PUBLICATIONS

Abstract, JP 05 051566, Mar. 2, 1993.

* cited by examiner

*Primary Examiner*—James J. Seidleck
*Assistant Examiner*—Melanie Bissett
(74) *Attorney, Agent, or Firm*—Colene H. Blank

(57) ABSTRACT

Pressure sensitive adhesive compositions, and adhesive articles based thereon, crosslinked using a bis-amide crosslinking agent that are thermally stable, yet cleanly removable from a variety of substrates following exposure to high temperatures.

32 Claims, No Drawings

CROSSLINKED PRESSURE SENSITIVE ADHESIVE COMPOSITIONS, AND ADHESIVE ARTICLES BASED THEREON, USEFUL IN HIGH TEMPERATURE APPLICATIONS

This application claims the benefit of U.S. Provisional Application No. 60/250,418, filed Dec. 1, 2000.

TECHNICAL FIELD

This invention relates to protecting surfaces using a pressure sensitive adhesive article such as a masking tape, particularly at high temperatures.

BACKGROUND

Masking tapes are used in a variety of applications involving exposure to high temperatures on the order of 150° C. or higher. For example, masking tapes known as lead frame tapes are used in the electronics industry to protect copper alloy lead frames against epoxy potting compound flash. As another example, masking tapes known as flash breaking tapes are used in the aerospace industry both for metal-to-metal bonding and composite bonding to help control the spread of bonding adhesives.

To be successful, these tapes must exhibit good adhesion to the desired substrate at high temperatures, yet be cleanly removable at the conclusion of the high temperature exposure to avoid leaving residue or other contaminants on the substrate surface. For example, in applications involving micro chip scale processing, the adhesion must be sufficient to prevent liquid epoxy resin from flowing into the interfacial region between the adhesive and the substrate to which the tape is adhered. Contamination is particularly a problem in applications involving the electronics industry because the contaminant can interfere with subsequent processing steps.

Currently, tapes featuring silicone-based pressure sensitive adhesives are used for high temperature applications, due to their outstanding thermal stability. However, these tapes often either contaminate the surface or leave silicone residue following removal, requiring a separate cleaning step prior to further processing. It is very desirable to develop silicone-free pressure sensitive adhesives that can be exposed to 150° C. to 230° C. for at least 30 minutes without leaving any adhesive residue upon removing. It is also very desirable to avoid the cleaning step prior to further processing if the adhesives do not contaminate the surface following removal.

The challenges are that all acrylic polymer based pressure sensitive adhesives have relatively poor thermal stability and they start to degrade slowly upon exposing to high temperature such as above 150° C., which reduces the cohesive strength of the adhesives and thus leads to adhesive residue problem.

The present invention is directed to acrylic pressure sensitive adhesives that can retain enough cohesive strength following high temperature exposure and are removed cleanly, i.e. with little or no contamination to substrate surface.

SUMMARY

In general, the invention features a pressure sensitive adhesive composition that includes the reaction product of (A) a copolymer comprising the reaction product of (a) a (meth)acrylate ester of a non-tertiary alcohol in which the alkyl group contains between 1 and 14 carbon atoms, inclusive, and whose homopolymer has a glass transition temperature no greater than about 0° C.; and (b) a carboxylic acid-functional, ethylenically unsaturated co-monomer; and (B) a bis-amide crosslinking agent having the formula:

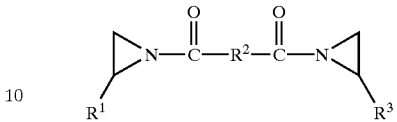

where $R^1$ and $R^3$ independently, are selected from the group consisting of H and $C_nH_{2n+1}$ where n is an integer ranging from 1 to 5, and $R^2$ is a divalent radical selected from the group consisting of benzeno ($—C_6H_4—$), substituted benzeno, triazine, $C_mH_{2m}$ where m is an integer ranging from 1 to 10, and combinations thereof. As used herein, a "copolymer" refers to a polymer prepared by reacting two or more monomers.

The relative amounts of the co-monomer and the crosslinking agent are selected such that the ratio of the number of equivalents of amide groups to the number of equivalents of carboxylic acid groups is at least about 0.1. To determine this ratio, the weight of each component (co-monomer and crosslinking agent) in the composition is divided by its theoretical equivalent weight to obtain the number of equivalents of each component. The ratio of equivalents of amide groups to equivalents of acid groups is then calculated equivalents (amide groups) divided by equivalents (acid groups).

The adhesive composition comprises no greater than 10% by weight of a tackifier and no greater than 2% by weight of a plasticizer.

In one aspect, the relative amounts of these materials are further selected such that the composition, when applied to a glass substrate at a thickness of 0.0008 inch and exposed to a temperature of 180° C. for 30 minutes, is cleanly removable following heat exposure. In a second aspect, the relative amounts of these ingredients are further selected such that the composition, when applied to a copper-containing substrate at a thickness of 0.0008 inch and exposed to a temperature of 180° C. for 30 minutes, is cleanly removable following heat exposure. By "cleanly removable" it is meant that following removal from the substrate, the substrate is substantially free of adhesive residue. Removability may be assessed according to the Test Methods, described below. In general, the lack of adhesive residue is determined visually with the unassisted eye.

The invention further features adhesive articles, such as tapes, based upon this adhesive composition, as well as a method for protecting the surface of a substrate using the adhesive article. According to this method, the adhesive article is applied to a substrate, after which the article and substrate are heated at a temperature ranging from about 150° C. to about 230° C. These conditions are representative of the conditions employed in processes used in the electronics industry. At the conclusion of the heating process, the article is cleanly removed from the substrate.

The invention provides pressure sensitive adhesive compositions, and articles that include these adhesives, that are thermally stable and have sufficiently high cohesive strength, even after high temperature exposure, thereby allowing them to be cleanly removed from a variety of substrates. These compositions are also chemically inert towards epoxy molding compounds. This feature makes them particularly useful as lead frame tapes because they do not adhere permanently to the epoxy molding compound that flows between the adhesive and the substrate on which the adhesive is placed during processing.

The details of one or more embodiments of the invention are set forth in the description below. Other features, objects, and advantages of the invention will be apparent from the description and from the claims.

DETAILED DESCRIPTION

This invention relates broadly to methods for protecting the surfaces of substrates that are subjected to high temperatures using adhesive articles that can be removed from the surface while leaving substantially no adhesive residue. Such methods include applying an adhesive article, such as a tape, to a surface, exposing the surface to a temperature within the range of about 150° C. to about 230° C., and cleanly removing the adhesive article from the surface such that substantially no adhesive residue remains, as determined by visual inspection with the unassisted eye.

The adhesive articles include a backing and a pressure sensitive adhesive disposed on the backing. These articles are cleanly removable after exposure to high temperature and optionally high pressure such that the articles can be removed from a surface by hand with substantially no adhesive residue remaining on the surface.

The substrate surface can be any of a wide variety of surfaces, including materials such as polymers, metals, metal oxides, glasses, and combinations thereof. Typically, the surface can be any of a wide variety of surfaces that are used in the aerospace industry or electronics industry. For example, the surface may be an epoxy-coated aluminum substrate, as used in the aerospace industry. The surface can also include silicon, a metal (e.g., aluminum, copper, gold, silver, or other metals), a metal oxide, polyimide or another polymeric material that are typically used in the electronics industry. Various combinations of these materials may also form the surface of the substrate. Thus, the adhesive articles can be used as flashbreaker tapes and as lead frame tapes, for example.

The surface on which the adhesive article is disposed is exposed to a target temperature within the range of about 150° C. to about 230° C. At the same time, the surface on which the adhesive article is disposed may also be subjected to pressure. For example, the substrate surface and adhesive article may be subjected to pressure on the order of about 320 psi (2197 KPa). In some embodiments, the method includes subjecting the surface to a reduced pressure (i.e., a pressure less than atmospheric pressure) after the adhesive article is applied thereto to get the parts to be bonded in intimate contact, with no void areas between them. Subsequently, the surface is exposed to an elevated temperature, alone or in combination with elevated pressure for a period of time. Typical time periods range from about 10 seconds to about 90 minutes, for example 30 minutes.

Following heating, the substrate and the adhesive article are cooled to room temperature, after which the adhesive article is removed. The adhesive articles are selected such that there is substantially no adhesive residue remaining on the surface. Removability may be evaluated visually with the unassisted eye using any of the Test Methods described below.

The backing of the adhesive article may be selected form a wide variety of backing materials that can withstand the high temperatures and optionally the high pressures described above without significant deterioration. Such backing materials preferably do not allow the material (e.g., epoxy adhesive) from which the surface is being protected to bond thereto. They can include paper, polymeric materials, cloth, metallic foils, etc. Examples of such materials include tear resistant backings, such as those disclosed in U.S. Pat. No. 6,048,431 (Clements et al.), and thermally stable backings (e.g., those that exhibit little or no shrinkage upon exposure to elevated temperatures), such as polyimides, polyamides, poly(tetrafluoroethylenes), and polyesters such as polyethylene terephthalate and polyethylene naphthalate. The polyesters preferably are heat stabilized. Examples of suitable polymeric materials include those sold under the trade designations KAPTON and TEFLON (available from E. I. DuPont de Nemours Co., Wilmington, Del.), KALADEX (available from Dupont Teijin Films, Wilmington, Del.) and NYLON. Particularly preferred polymeric backing materials include polyimides such as those sold under the trade designation KAPTON. If desired, the backing can be modified prior to application of the adhesive composition to enhance adhesion between the adhesive and the backing by applying a primer composition to the backing or by exposing the backing to a corona or flame treatment, as is known in the art. Use of a primer is especially preferred when using a polyethylene terephthalate or a polyethylene naphthalate backing.

The adhesive article can be constructed to include a tab along a longitudinal edge of the backing. The presence of a tab makes it easier to lift an edge of the article during the removal process. The tab can be created in a variety of ways including, for example, by not coating adhesive composition on the finger lift portion, deadening the adhesive composition in the area of the finger lift portion, using a thicker film to act as a tab along the edge, folding a portion of the article on itself to cover the adhesive composition, or adhering additional backing to a portion of the exposed adhesive composition.

The adhesive composition is a crosslinked pressure sensitive adhesive composition comprising the reaction product of a copolymer and a bis-amide crosslinking agent. The copolymer, in turn, is the reaction product of at least (a) a (meth)acrylate ester of a non-tertiary alcohol in which the alkyl group (on the alcohol) contains about 1 to 14 carbon atoms (on average), generally between 4 and 14 carbon atoms and whose homopolymer has a Tg (glass transition temperature) of no greater than about 0° C., and (b) a carboxylic acid-functional, ethylenically unsaturated co-monomer. Other monomers may be reacted as well to form the copolymer. For example, ethylenically unsaturated monomers whose homopolymers have a Tg of at least about 10° C. may be used.

Examples of suitable (meth)acrylate esters, which may be used alone or in combination with each other, include butyl acrylate, 2-methylbutyl acrylate, 2-ethylhexyl acrylate, isooctyl acrylate, lauryl acrylate, n-decyl acrylate, 4-methyl-2-pentyl acrylate, isoamyl acrylate, sec-butyl acrylate, and isononyl acrylate. Examples of useful carboxylic acid-functional monomers, which may be used alone or in combination with each other, include acrylic acid, methacrylic acid, itaconic acid, maleic acid, and fumaric acid. Examples of other monomers that may be co-polymerized with the (meth)acrylate ester and carboxylic acid-functional monomers include ethyl acrylate, (meth)acrylamide, alpha-olefins, vinyl ethers, allyl ethers, styrene, maleic acid esters, 2-hydroxyethyl (meth)acrylate, cyclohexyl acrylate, t-butyl acrylate, phenyl acrylate, isobornyl acrylate, 2-phenoxyethyl acrylate, N-vinyl pyrrolidone, N-vinyl caprolactam, and substituted acrylamides such as N-ethyl acrylamide, N-hydroxyethyl acrylamide, N-octyl acrylamide, N-t-butyl acrylamide, N,N-dimethyl acrylamide, N,N-diethyl acrylamide, and N-ethyl-N-dihydroxyethyl acrylamide.

The crosslinking agent is an aromatic bis-amide crosslinking agent having the formula:

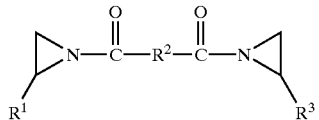

where $R^1$ and $R^3$ independently, are selected from the group consisting of H and $C_nH_{2n+1}$ where n is an integer ranging from 1 to 5, and $R^2$ is a divalent radical selected from the group consisting of benzeno (—$C_6H_4$—), substituted benzeno, triazine, $C_mH_{2m}$ where m is an integer ranging from 1 to 10, and combinations thereof. A particularly useful bis-amide crosslinking agent falling within this formula is 1,1'-isophthaloyl-bis(2-methylaziridine) [CAS No. 7652-64-4], as described in U.S. Pat No. 4,418,120 (Kealy et al.).

The relative amounts of carboxylic acid-functional co-monomer and bis-amide crosslinking agent are selected to produce a crosslinked adhesive that adheres well at high temperatures, yet whose cohesive strength is sufficient such that it is cleanly removable following high temperature exposure. Preferably, the amount of the co-monomer is between about 1–5% by weight, inclusive, based upon the total weight of the copolymer, more preferably between about 1–2.5% by weight, inclusive, and even more preferably between about 1.5–2.5% by weight, inclusive. The ratio between the number of equivalents of amide groups in the crosslinking agent to the number of equivalents of carboxylic acid groups is at least 0.1, preferably at least about 0.5, and more preferably between about 0.5 and about 1.3, inclusive. In a specific example, the ratio of the number of equivalents of amide groups in the crosslinking agent to the number of equivalents of carboxylic acid groups is between about 0.7 and about 1.0 inclusive.

The adhesive may also include conventional additives such as tackifiers, plasticizers, flow modifiers, neutralizing agents, stabilizers, antioxidants, fillers, dyes, colorants, and the like, as long as they do not interfere with the desired performance characteristics of the adhesive.

Specifically, the adhesive comprises no greater than 10% by weight of a tackifier. Examples of tackifiers for an acrylic pressure sensitive adhesive include terpene phenolics, rosins, rosin esters, esters of hydrogenated rosins, synthetic hydrocarbon resins and combinations thereof. In preferred embodiments, the adhesive of the present invention contains less than 5% tackifier, and most preferably between 0% and 2% tackifier inclusive.

Additionally, the adhesive comprises no greater than 2% by weight of a plasticizer. The plasticizer may be chosen so that it is compatible with the adhesive. Examples of plasticizers include polyethylene oxides, adipic acid esters, phosphoric acid esters, sulfonamides, benzoic acid esters, polypropylene oxides and formic acid esters. In preferred embodiments, the adhesive of the present invention contains less than 1% plasticizer, and most preferably between 0% and 0.5% plasticizer inclusive.

The adhesive composition is preferably prepared via a solution polymerization method using a thermally activated free radical initiator. Examples of useful initiators include azo compounds such as 2,2'-azobis (isobutyronitrile), hydroperoxides such as tert-butyl peroxide, and peroxides such as benzoyl peroxide and cyclohexanone peroxide.

EXAMPLES

These examples are merely for illustrative purposes only and are not meant to be limiting on the scope of the appended claims. All parts, percentages, ratios, etc. in the examples and the rest of the specification are by weight unless indicated otherwise.

Test Methods
Peel Adhesion Strength (Method A)

Pressure sensitive adhesive tape samples, prepared as described in the Examples, were cut into 0.5 inch (1.27 centimeter (cm)) wide test strips having a length of about 6 inches (15.2 cm). Five test strips were applied to a glass plate (adhesive in contact with the glass) using a 4.5 pound (2.04 kilogram (kg)) rubber roller by passing the roller over the test strip lengthwise 3 times in each direction. Prior to application of the test strips, the glass plate was cleaned with methyl ethyl ketone (MEK) and KIMWIPE™ EX-L paper tissue (available from Kimberly-Clark, Atlanta, Ga.). The glass plate having the test strips thereon was placed in a circulating air oven, set at 180° C., for 30 minutes. The glass plate was then removed, allowed to cool to room temperature, then conditioned at 23° C./50% relative humidity for between 30 and 60 minutes prior to testing.

The 180° angle peel adhesion strength of each test strip was then measured using an Analogic peel tester (Model number 3M-90, available from Instrumentors, Inc., Strongsville, Ohio) at a peel rate of 12 inches/minute (30.5 cm/minute). Peel data was acquired over a 5 second test period after the initial startup force had stabilized. A portion of each test strip was peeled back and the average peel force value was measured. This was done on three separate portions of each test strip. These three results were used to calculate an average peel force value for each test strip. This value was normalized to a tape width of 1 inch (2.54 cm). The results from the five test strips were used to obtain an average peel adhesion strength value for each Example. This test method was repeated with new test strips at each of 3 additional temperatures: 200° C., 220° C., and 240° C.

Peel Adhesion Strength (Method B)

Within three days of preparation the tapes were evaluated for peel adhesion strength at room temperature. More specifically, the tape was stored in roll form at 72 to 77° F. (22 to 25° C.) and 30 to 35% relative humidity with a protective liner over the adhesive layer for up to three days prior to application (without the liner) to a copper alloy (Olin 194, available from E. Jordan Brooks Company, Santa Fe Springs, Calif.) panel measuring 2 inches by 5 inches (5.1 by 12.7 cm) and having a thickness of 0.032 inches (0.8 mm). The copper alloy substrate test surface was first cleaned by wiping it with methyl ethyl ketone using a KIMWIPE™ EX-L paper tissue (available from Kimberly-Clark, Atlanta, Ga.). Next, three tape samples, each having a width of 0.5 inches (1.3 cm) and a length of about 6 inches (15.2 cm), were applied to the copper alloy substrate by first removing the liner and then rolling tape down onto the substrate using a 4.5 pound (2.0 kg) rubber roller with one pass in each direction such that the adhesive face of the tape contacted the substrate. The tape samples were positioned such that one inch of the tape length extended past the edge of the substrate. After a dwell of about 24 hours at 72 to 77° F. (22 to 25° C.) and 30 to 35% relative humidity, the peel adhesion strength was measured using an INSTRON Model 4465 tensile tester (available from INSTRON Corporation, Canton, Mass.) equipped with a 5 pound (22.3 N) load cell at a rate of 12 inches/minute (30.5 cm/minute) at an angle of 90 degrees. The length of tape extending past the substrate was attached to the dynamic jaw (grip) of the INSTRON tester. The test results were analyzed using Series IX software (available from INSTRON Corporation, Canton, Mass.) to obtain the average peel adhesion strength in ounces/0.5 inch. The three results were used to obtain an overall average value.

Peel Adhesion Strength (Method C)

Within three days of preparation, the tapes were evaluated for peel adhesion strength at room temperature as described in "Peel Adhesion Strength (Method B)" above with the following modifications. The samples were subjected to simultaneous heat and pressure prior to peel testing. The copper panel was placed on an aluminum plate having width and length dimensions larger than that of the compression bonder surface on which it was to be placed, and a thickness of about 0.062 inches (0.16 cm). The aluminum plate (bottom) with the copper alloy panel (top) having test strips thereon was placed in a compression bonding unit which had been preheated to a temperature of 180° C., and 2000 pounds of force (8914 N) was applied, resulting in a pressure of 267 pounds/square inch (1.83 MPa) on the test strips. This pressure and temperature were maintained for 30 minutes, after which the pressure was released, the samples were removed, and allowed to equilibrate at 72 to 77° F. (22 to 25° C.) and 30 to 35% relative humidity for up to 6 hours before measuring the peel adhesion strength.

Peel Adhesion Strength (Method D)

The tapes were evaluated for peel adhesion strength at room temperature as described in "Peel Adhesion Strength (Method B)" above with the following modifications. Within 24 hours of preparation, tape samples having a protective liner over the adhesive face were aged in roll form for 72 hours ±1 hour in a circulating air oven set at a temperature of 60° C. The samples were then removed and allowed to equilibrate at 72 to 77° F. (22 to 25° C.) and 30 to 35% relative humidity for about 24 hours, after which they were tested as described above.

Peel Adhesion Strength (Method E)

The tapes were evaluated for peel adhesion strength at room temperature as described in "Peel Adhesion Strength (Method D)" above with the following modification. After the samples were aged and cooled they were tested according to "Peel Adhesion Strength (Method C)" above.

Removability (Method A)

After the test strips were peeled back from the glass substrate, as described above in "Peel Adhesion Strength" (method A), the glass substrate was visually inspected with the unaided eye for residue, both at the edges of where the tape had been adhered and in the area in-between. The adhesive layer of the tape was also inspected for missing spots of adhesive and deformation of adhesive. A grade of "Pass" was assigned to those examples where 1) only small amounts of edge residue was observed, and there sometimes occurred a slight stretching of the adhesive as the tape was pulled away from the substrate; or 2) no residue or stretching of the adhesive layer was observed. Samples not meeting these requirements were graded as "Fail."

Removability (Method B)

After the tape samples were peeled away from the substrate, as described in "Peel Adhesion Strength (Method B)" above, the substrate surface was evaluated visually with the unaided eye to determine if any adhesive residue remained on either the newly exposed surface (referred to as "adhesive residue") or at the edges (referred to as "edge beading") of where the tape had been. By "edge beading" it is meant that a thin line of adhesive residue, of variable length, was observed along the original edge of the lengthwise border of the test strip. Samples exhibiting no edge beading or adhesive residue were graded as "Pass". Samples which had adhesive residue and/or edge beading covering a total of 5% or less of the substrate surface were also graded as "Pass". Samples not meeting these requirements were graded as "Fail".

Removability (Method C)

After the tape samples were peeled away from the substrate, as described in "Peel Adhesion Strength (Method C)" above, the substrate surface was evaluated as described in "Removability (Method B)" above.

Removability (Method D)

After the tape samples were peeled away from the substrate, as described in "Peel Adhesion Strength (Method D)" above, the substrate surface was evaluated as described in "Removability (Method B)" above.

Removability (Method E)

After the tape samples were peeled away from the substrate, as described in "Peel Adhesion Strength (Method E)" above, the substrate surface was evaluated as described in "Removability (Method B)" above.

EXAMPLES

Example 1

An acrylic pressure sensitive adhesive was prepared by first polymerizing acrylic monomers, then adding a solution of bis-amide crosslinker to the solution polymer. More specifically, using the amounts shown in Table 1 below, n-butyl acrylate, acrylic acid, and acetone were added to a 16 ounce bottle to provide a 28.3% solids solution. VAZO® 67 (a thermal polymerization initiator, available from E. I. du Pont de Nemours and Company, Wilmington, Del.) was dissolved in the solution of monomers. A nitrogen gas purge was run through the solution for about 3 minutes, followed by capping of the bottle. The capped bottle was placed in a rotating laundrometer at a temperature of 57° C. for 24 hours. After removal from the laundrometer the bottle was allowed to cool to room temperature (about 24° C.). The solids level was measured and found to be 28.3% by weight. Next, to 30 grams of this polymer solution was added a 5% solution (by weight) of 1,1'-isophthaloyl-bis(2-methylaziridine) crosslinker (CAS No.7652-64-4) in toluene. In addition, 2% by weight, based on the weight of polymer, of IRGANOX 1010 (an antioxidant, available from Ciba Speciality Chemicals of Tarrytown, N.Y.) was added to the polymer solution. The bottle was recapped and placed on a shaker for about 1 hour.

This solution was coated onto 0.002 inch thick (0.051 mm) KAPTON™ film (a polyimide film having the designation "Grade H," available from E. I. DuPont Company, Wilmington, Del.) using a knife-over-bed notched bar coating station, having a gap setting of 0.004 inches (0.102 mm) greater than the film thickness. The film was pulled through the coating station by hand at approximately 30 to 40 inches/minute (76.2 to 102 centimeters/minute). The coated film was taped onto a support with the adhesive side exposed and placed in a circulating air oven set at 70° C. for 30 minutes. The actual oven temperature was believed to be within 5° C. of the setpoint. The support with the dried pressure sensitive adhesive (PSA) tape was then removed from the oven, allowed to cool to room temperature, and placed in a constant temperature/humidity room (23° C./50% relative humidity) in a vertical (relative to the room floor) storage rack for between 3 and 5 days before testing. The final dried adhesive thickness was 0.0008 inch (0.020 mm). The PSA tape was evaluated for peel adhesion (Method A) and removability (Method A) after aging at various temperatures. The results are shown in Tables 2 and 3 below.

Example 2a and Example 2b

Example 1 was repeated except the amounts of acrylic monomers and bis-amide crosslinker solution were changed as shown in Table 1 below. The results are shown in Tables 2 and 3 below. This example is referred to as "Example 2a". This example was prepared a second time when a comparison was run with Examples 3 and 4 below. This second preparation is referred to as "Example 2b".

TABLE 1

| Example | n-Butyl Acrylate (grams) | Acrylic Acid (grams) | Acetone (grams) | VAZO 67 (grams) | Bis-amide Solution (5% solids) (grams) |
|---|---|---|---|---|---|
| 1 | 98.5 | 1.5 | 258 | 0.3 | 4.88 |
| 2a | 98.0 | 2.0 | 258 | 0.3 | 6.51 |

TABLE 2

| Example | Stoichiometric Ratio (eqts. Amide/eqts. Acid) | Peel Adhesion Strength in oz./inch (N/25 mm) | | | |
|---|---|---|---|---|---|
| | | 180° C. for 0.5 hours | 200° C. for 0.5 hours | 220° C. for 0.5 hours | 240° C. for 0.5 hours |
| 1 | 1.12 | 7.5 (2.09) | 10.8 (3.01) | 15.1 (4.21) | 19.2 (5.35) |
| 2a | 1.12 | 6.3 (1.75) | 7.2 (2.00) | 8.8 (2.45) | 16.4 (4.57) |

TABLE 3

| Example | Stoichiometric Ratio (eqts. Amide/eqts. Acid) | Removability | | | |
|---|---|---|---|---|---|
| | | 180° C. for 0.5 hours | 200° C. for 0.5 hours | 220° C. for 0.5 hours | 240° C. for 0.5 hours |
| 1 | 1.12 | Pass | Pass | Fail | Fail |
| 2a | 1.12 | Pass | Pass | Pass | Fail |

Example 3

Example 2 was repeated with the following modification: no IRGANOX 1010 was used. The results are shown in Tables 4 and 5 below.

Example 4

Example 2 was repeated with the following modifications. A polymer solution of isooctyl acrylate:acrylic acid/98:2 (w:w) was used in place of the butyl acrylate:acrylic acid/98:2 polymer solution. The results are shown in Tables 4 and 5 below.

TABLE 4

| Example | Stoichiometric Ratio (eqts. Amide/ eqts. Acid) | Peel Adhesion Strength in oz./inch (N/25 mm) | | |
|---|---|---|---|---|
| | | 180° C. for 0.5 hours | 200° C. for 0.5 hours | 220° C. for 0.5 hours |
| 2b | 1.12 | 4.9 (1.36) | 5.4 (1.50) | 6.6 (1.84) |
| 3 | 1.12 | 4.9 (1.36) | 5.8 (1.53) | 6.8 (1.89) |
| 4 | 1.12 | 2.8 (0.78) | 5.2 (1.45) | 3.5 (0.97) |

TABLE 5

| Example | Stoichiometric Ratio (eqts. Amide/ eqts. Acid) | Removability | | |
|---|---|---|---|---|
| | | 180° C. for 0.5 hours | 200° C. for 0.5 hours | 220° C. for 0.5 hours |
| 2b | 1.12 | Pass | Pass | Pass |
| 3 | 1.12 | Pass | Pass | Pass |
| 4 | 1.12 | Pass | Fail | Fail |

Example 5

An acrylic adhesive tape was prepared by first solution polymerizing acrylic monomers, then adding a solution of bis-amide crosslinker to the polymer solution. More specifically, a solution polymer of isooctyl acrylate (IOA):isobornyl acrylate (IBoA):methacrylic acid (MAA)/85.0:12.5:2.5 (w/w) was prepared in the following manner. To a glass bottle were added 136 parts by weight (pbw) of isooctyl acrylate (available from Aldrich Chemical, Milwaukee, Wis.), 20 pbw of isobornyl acrylate (available from BASF Corporation, Ludwigshafen, Germany), 4 pbw of methacrylic acid (available from BASF Corporation), 0.48 pbw of VAZO™ 64 (a thermally activated polymerization initiator available from E. I. DuPont de Nemours and Company, Wilmington, Del.), 80 pbw toluene, and 87 pbw acetone. This solution was purged with nitrogen for 2 minutes, then the bottle was sealed and placed in a rotating water bath at 57° C. for 24 hours. The resulting polymer solution was further diluted with 32 pbw toluene and 32 pbw ethyl acetate to give an initial polymer solution.

Next, to 500 grams of this 40.0% solids polymer solution in a glass jar were added 144 grams of a 5% solution (by weight) of 1,1'-isophthaloyl-bis(2-methylaziridine) crosslinker in toluene, and an additional 115 grams of toluene. The jar was capped and placed on a roller mill for between 15 and 30 minutes to give a 27.3% solids coating solution. This final polymer solution was coated onto 0.001 inch thick (0.025 mm) KALADEX® 2030 film (a biaxially oriented polyethylene napththalate film, available from DuPont Teijin Film™, Wilmington, Del.) using a notched bar-over-bed coating station at a speed of 10 feet/minute (3.05 meters/minute). Prior to coating with the adhesive solution, the KALADEX® film was treated with a 10% solids primer solution. For coating the adhesive solution, the gap between the film and the notched bar was adjusted to provide the dried adhesive thickness reported below. The coated film was passed through a drying oven having a length of 60 feet (18.3 meters) and having three temperature zones of approximately equal length. The zone temperatures were as follows: zone 1=150° F. (66° C.); zone 2=175° F. (79° C.); and zone 3=220° F. (104° C.). The dried adhesive tape had an adhesive layer thickness of about 0.0008 inches (0.020 mm). A protective non-silicone release liner was applied over the adhesive layer as the tape was wound onto a roll that was then stored at 24° C. to 26° C. The adhesive tape was evaluated for peel adhesion (methods B, C, D, and E) and removability (methods B, C, D and E) as described above. The results are shown in Tables 6 and 7 below.

Example 6

Example 5 was repeated with the following modifications. To the initial polymer solution was added 72 grams of bis-amide crosslinking agent and 187 grams of additional toluene. The results are shown in Tables 6 and 7 below.

TABLE 6

| Example | Stoichiometric Ratio (eqts. Amide/ eqts. Acid) | Peel Adhesion Strength in oz./ 0.5 inch (N/12.5 mm) | | | |
|---|---|---|---|---|---|
| | | Method B | Method C | Method D | Method E |
| 5 | 0.99 | 14.5 (4.04) | 10.4 (2.90) | 6.5 (1.81) | 8.4 (2.34) |
| 6 | 0.49 | 16.6 (4.62) | 15.2 (4.23) | 8.9 (2.48) | 11.3 (3.15) |

TABLE 7

| Example | Stoichiometric Ratio (eqts. Amide/ eqts. Acid) | Removability | | | |
|---|---|---|---|---|---|
| | | Method B | Method C | Method D | Method E |
| 5 | 0.99 | Pass | Pass | Pass | Pass |
| 6 | 0.49 | Pass | Pass | Pass | Pass |

Example 7

Example 5 was repeated with the following modifications. A solution polymer having a composition of butyl acrylate (BA):acrylic acid (AA)/98:2 (w/w) was prepared in acetone at 27.0% solids using 109.8 pbw butyl acrylate, (available from BASF Corporation, Ludwigshafen, Germany), 2.2 pbw acrylic acid (available from BASF Corporation), 0.17 pbw VAZO® 67 (a thermally activated polymerization initiator available from E.I. DuPont de Nemours and Company, Wilmington, Del.), and 288 pbw acetone. This initial polymer solution was measured and found to be 27.0% solids.

Next, to 500 grams of this 27.0% solids polymer solution in a glass jar was added 111 grams of a 5% solution (by weight) of 1,1'-isophthaloyl-bis(2-methylaziridine) crosslinker in toluene. This resulted in a 23.0% solids coating solution. The adhesive tape obtained was evaluated for peel adhesion (methods B, C, D, and E) and removability (methods B, C, D, and E) as described above. The results are shown in Tables 8 and 9 below.

Example 8

Example 7 was repeated with the following modification. 55.5 grams of the bis-amide crosslinker solution was employed. This resulted in a 24.8% solids coating solution. The results are shown in Tables 8 and 9 below.

Example 9

Example 7 was repeated with the following modifications. 27.8 grams of the bis-amide crosslinker solution was employed, and 61.0 grams of additional toluene was used. This resulted in a 23.2% solids coating solution. The results are shown in Tables 8 and 9 below.

Example 10

Example 7 was repeated with the following modifications. 13.9 grams of the bis-amide crosslinker solution was employed, and 73.0 grams of additional toluene was used. This resulted in a 23.1% solids coating solution. The results are shown in Tables 8 and 9 below.

Example 11

Example 7 was repeated with the following modifications. The polymer solution was used in an amount of 250 grams; 55.5 grams of the bis-amide crosslinker solution was employed; and 305.5 grams of additional toluene was used. This resulted in an 11.5% solids coating solution. The results are shown in Tables 8 and 9 below.

Example 12

Example 11 was repeated with the following modifications. 6.9 grams of the bis-amide crosslinker solution was employed; and 354.1 grams of additional toluene was used. This resulted in an 11.1% solids coating solution. The results are shown in Tables 8 and 9 below.

TABLE 8

| Example | Stoichiometric Ratio (eqts. Amide/ eqts. Acid) | Adhesive thickness (inch) | Peel Adhesion Strength in oz./ 0.5 inch (N/12.5 mm) | | | |
|---|---|---|---|---|---|---|
| | | | Method B | Method C | Method D | Method E |
| 7 | 1.20 | 0.0008 | 8.2 (2.28) | 9.1 (2.53) | 2.2 (0.61) | 5.9 (1.64) |
| 8 | 0.60 | 0.0008 | 8.6 (2.40) | 8.5 (2.37) | 2.3 (0.64) | 5.7 (1.59) |
| 9 | 0.30 | 0.0008 | 9.4 (2.62) | 11.5 (3.20) | 3.5 (0.97) | 8.2 (2.28) |
| 10 | 0.15 | 0.0008 | 11.6 (3.23) | 17.8 (4.96) | 7.0 (1.95) | 12.2 (3.40) |
| 11 | 1.20 | 0.0004 | 5.6 (1.56) | 9.3 (2.59) | 1.6 (0.45) | 6.3 (1.75) |
| 12 | 0.15 | 0.0004 | 7.9 (2.20) | 12.9 (3.59) | 3.1 (0.86) | 10.3 (2.87) |

TABLE 9

| Example | Stoichiometric Ratio (eqts. Amide/ eqts. Acid) | Adhesive thickness (inch) | Removability | | | |
|---|---|---|---|---|---|---|
| | | | Method B | Method C | Method D | Method E |
| 7 | 1.20 | 0.0008 | Pass | Pass | Pass | Pass |
| 8 | 0.60 | 0.0008 | Pass | Pass | Pass | Pass |
| 9 | 0.30 | 0.0008 | Pass | Pass | Pass | Pass |
| 10 | 0.15 | 0.0008 | Pass | Pass | Pass | Pass |
| 11 | 1.20 | 0.0004 | Pass | Pass | Pass | Pass |
| 12 | 0.15 | 0.0004 | Pass | Pass | Pass | Pass |

Example 13

A solution polymer of butyl acrylate:ethyl acrylate:acrylic acid (BA:EA:AA)/43:55:2 was prepared, and used to prepare an adhesive tape article which was then evaluated. More specifically, 43 pbw BA, 55 pbw EA, 2 pbw AA, and 0.2 pbw VAZO 67 were added to 233 pbw of ethyl acetate in a container which then sealed and placed in a laundrometer for 24 hours at 58° C. to give a 30% solids polymer solution. Next, 23.2 pbw of a 5% solution (by weight) of 1,1'-isophthaloyl-bis(2-methylaziridine) crosslinker (CAS No. 7652-64-4) in toluene was added to 100 pbw of this polymer solution. This resulted in a stoichiometric ratio (equivalents amide/equivalents acid) of 1.13. The container was resealed and placed on a shaker for about 1 hour. This final polymer solution was converted to a tape article, having a final dried adhesive thickness of 0.0008 inch (0.02 mm), as described in Example 1. The tape was evaluated as described in "Peel Adhesion Strength" (Methods A and C) and "Removability" (Methods A and C) with the following modifications to Method C. The tape was evaluated within 10 days of preparation using an IMASS peel tester (available from Instrumentators, Inc., Strongsville, Ohio); a 0.001 inch (0.025 mm) thick KAPTON film was placed between the KAPTON backing of the tape and the compression bonder; the peel test results were normalized to a width of one inch (2.54 cm); and only two test strips were evaluated and used to calculate an average peel adhesion strength value. The results are shown in Tables 10 and 11 below.

TABLE 10

| Example | Stoichiometric Ratio (eqts. Amide/eqts. Acid) | Peel Adhesion Strength in oz./inch (N/25 mm) (Method A) | | | |
|---|---|---|---|---|---|
| | | 180° C. for 0.5 hours | 200° C. for 0.5 hours | 220° C. for 0.5 hours | 240° C. for 0.5 hours |
| 13 | 1.13 | 20.1 (5.60) | 20.6 (5.74) | 22.1 (6.16) | 26.8 (7.46) |

TABLE 11

| Example | Stoichiometric Ratio (eqts. Amide/ eqts. Acid) | Removability (Method A) | | | |
|---|---|---|---|---|---|
| | | 180° C. for 0.5 hours | 200° C. for 0.5 hours | 220° C. for 0.5 hours | 240° C. for 0.5 hours |
| 13 | 1.13 | Pass | Pass | Pass | Fail |

TABLE 12

| Example | Stoichiometric Ratio (eqts. Amide/ eqts. Acid) | Peel Adhesion Strength in oz./inch (N/25 mm) Method C | Removability (Pass/Fail) Method C |
|---|---|---|---|
| 13 | 1.13 | 24.6 (6.85) | Pass |

Example 14

The effect of a tape of the invention and a standard silicone adhesive-based tape on the surface energy of a copper panel after exposure to heat and pressure was evaluated. More specifically, two tape test strips, one of the tape of Example 7 and one having the designation "TRM 6250" (a tape having a silicone adhesive on a polyimide film backing, available from Nitto Denko, Inc., Fremont, Calif.), were applied to a copper alloy panel and conditioned as described in "Peel Adhesion Strength (Method C)" above with the following modifications. The test strip of the tape of Example 7 had been stored, with a protective liner over the adhesive, for about 7 weeks on the benchtop at ambient conditions (72 to 77° F. (22 to 25° C.) and 30 to 35% relative humidity) prior to testing. The protective liner was removed just prior to testing. The TRM 6250 tape was obtained in roll form without a protective liner. The tape test strips were aged for at least 12 hours at ambient conditions before applying heat and pressure. A force of 1600 pounds was applied, which corresponded to a pressure of 320 psi on the test strips.

After removal of the copper alloy panel from heat and pressure and equilibration, the strips were each peeled back away from a portion of the panel to expose the underlying surface. Visual inspection with the unaided eye revealed no residue for either test strip. However, the surface that had been covered by the TRM 6250 tape exhibited a red color. In contrast, the surface that had been covered by the tape of Example 7 exhibited no discoloration; it was the same color as the untaped surface prior to the application of heat and pressure.

Next, the surface energy of the areas that had been covered by the two different tapes during application of heat and pressure was evaluated using pens containing liquids having surface tensions ranging from 36 to 48 dynes (available from Dyne Line LLC, Watertown, Wis.). The pens were used to draw lines across the surfaces exposed after peeling back a section of each tape (following conditioning with heat and pressure), as well as an unconditioned, untaped panel surface. All the liquids were observed to wet out on the initial panel surface for at least 2 seconds, indicating a panel surface energy of at least 48 dynes/centimeter. The same result was obtained for the area that had been covered by the tape of Example 7. In contrast, the liquids did not wet out the area, which had been covered by the TRM 6250 tape, indicating a panel surface energy of less than 36 dynes/centimeter. Silicone adhesive tapes are known to leave invisible (to the unaided eye) residue that has adverse effects on subsequent processing steps such as metal plating, soldering, etc. These results indicate that the tape of Example 7 had less effect on the surface energy of the panels than did the TRM 6250 tape.

Examples 15–17 (Comparative)

Example 2 was repeated with the following modifications. A polymer solution of isooctyl acrylate:acrylic acid/90:10 (w:w) was used in place of the butyl acrylate:acrylic acid/ 98:2 polymer solution. Various amounts of bis-amide crosslinker solution were added as shown in Table 13, below. The samples were coated on 1 mil polyimide film and cured at 70° C. for 2 hours before testing. The 180° angle peel adhesion strength was then measured at a peel rate of 12 inches/minute (30.5 cm/minute). After the Peel Adhesion Strength test was performed, the polyimide film substrate was visually with the unaided eye for residue. All samples left unacceptable levels of residue at after exposure to 180° C., 200° C. and 220° C., respectively for 30 minutes. The results in Tables 13 and 14 below.

TABLE 13

| Example | Bisamide % w/w | Stoichiometric Ratio (eqts. Amide/ eqts. Acid) | Peel Adhesion Strength in oz./inch (N/25 mm) | | |
|---|---|---|---|---|---|
| | | | 180° C. for 0.5 hours | 200° C. for 0.5 hours | 220° C. for 0.5 hours |
| 15 | 0.3% | 0.02 | 91.0 (25.39) | 80.0 (22.32) | 69.4 (19.36) |
| 16 | 0.5% | 0.03 | 85.0 (23.72) | 75.8 (21.15) | 63.6 (17.75) |
| 17 | 0.7% | 0.04 | 75.0 (20.93) | 58.6 (16.35) | 60.0 (16.74) |

TABLE 14

| Example | Bisamide % w/w | Stoichiometric Ratio (eqts. Amide/eqts. Acid) | Removability 180° C. for 0.5 hours | Removability 200° C. for 0.5 hours | Removability 220° C. for 0.5 hours |
|---|---|---|---|---|---|
| 15 | 0.3% | 0.02 | Fail | Fail | Fail |
| 16 | 0.5% | 0.03 | Fail | Fail | Fail |
| 17 | 0.7% | 0.04 | Fail | Fail | Fail |

Examples 18–20

Example 2 was repeated with the following modifications. To a polymer solution of butyl acrylate:acrylic acid/98:2 (w:w) was added: bis-amide crosslinker solution, Foral® 85 tackifier and/or Pycal® 94 plasticizer. The samples were coated on 1 mil (0.025 mm) polyimide film, dried for 5 minutes at 200° C. and cured at 60° C. for 48 hours before testing. The samples were adhered to glass panels and heated in an oven at 180° C. for 1.5 hours. The samples were peeled back by hand at a 180° angle at a peel rate of approximately 12 inches/minute (30.5 cm/minute). Both the glass surface and the polyimide film substrate were visually inspected with the unaided eye for residue. All samples peeled off cleanly and received a "pass" rating. The results are shown in Table 15.

TABLE 15

| Example | Stoichiometric Ratio (eqts. Bisamide/eqts. Acrylic Acid) | % Foral® 85 (% to polymer solids) | % Pycal® 94 (% to polymer solids) | Removability from glass after 180° C., 1.5 hrs. |
|---|---|---|---|---|
| 18 | 0.1 | 11 | 3 | Pass |
| 19 | 0.1 | 0 | 3 | Pass |
| 20 | 0.1 | 11 | 0 | Pass |

Various modifications and alterations of the present invention will become apparent to those skilled in the art without departing from the spirit and scope of the invention.

What is claimed is:

1. An adhesive article comprising:
   (1) a backing; and
   (2) a pressure sensitive adhesive composition on said backing, said composition comprising the reaction product of:
      (A) a copolymer comprising the reaction product of (a) a (meth)acrylate ester of a non-tertiary alcohol in which the alkyl group contains between 1 and 8 carbon atoms, inclusive, and whose homopolymer has a glass transition temperature no greater than about 0° C.; and (b) a carboxylic acid-functional, ethylenically unsaturated co-monomer; and
      (B) a bis-amide crosslinking agent having the formula:

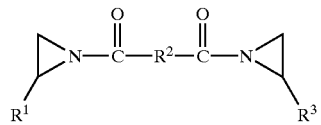

where $R^1$ and $R^3$ independently, are selected from the group consisting of H and $C_nH_{2n+1}$ where n is an integer ranging from 1 to 5, and $R^2$ is a divalent radical selected from the group consisting of benzeno ($-C_6H_4-$), substituted benzeno, triazine, $C_mH_{2m}$ where m is an integer ranging from 1 to 10, and combinations thereof, the relative amounts of said co-monomer and said crosslinking agent being selected such that (i) the ratio of the number of equivalents of amide groups to the number of equivalents of carboxylic acid groups is at least about 0.5, wherein the pressure sensitive adhesive composition comprises no greater than 10% by weight of a tackifier and no greater than 2% by weight of a plasticizer.

2. An adhesive article according to claim 1 wherein said ratio is between about 0.5 and about 1.3, inclusive.

3. An adhesive article according to claim 1 wherein said ratio is between about 0.7 and about 1.0 inclusive.

4. An adhesive article according to claim 1 wherein said carboxylic acid-functional co-monomer is selected from the group consisting of acrylic acid, methacrylic acid, and combinations thereof.

5. An adhesive article according to claim 1 wherein said (meth)acrylate ester is selected from the group consisting of butyl acrylate, 2-methylbutyl acrylate, 2-ethyl hexyl acrylate, isooctyl acrylate, 4-methyl-2-pentyl acrylate, isoamyl acrylate, sec-butyl acrylate, and combinations thereof.

6. An adhesive article according to claim 1 wherein said (meth)acrylate ester is butyl acrylate.

7. An adhesive article according to claim 1 wherein said crosslinking agent comprises 1,1'-isophthaloyl-bis(2-methylaziridine).

8. An adhesive article according to claim 1 wherein the amount of said co-monomer is between about 1–5% by weight, inclusive, based upon the total weight of said copolymer.

9. An adhesive article according to claim 1 wherein the amount of said co-monomer is between about 1–2.5% by weight, inclusive, based upon the total weight of said copolymer.

10. An adhesive article according to claim 1 wherein the amount of said co-monomer is between about 1.5–2.5% by weight, inclusive, based upon the total weight of said copolymer.

11. An adhesive article according to claim 1 wherein the alkyl group contains between 4 and 8 carbon atoms.

12. A pressure sensitive adhesive composition comprising the reaction product of:
   (A) a copolymer comprising the reaction product of (a) a (meth)acrylate ester of a non-tertiary alcohol in which the alkyl group contains between 1 and 8 carbon atoms, inclusive, and whose homopolymer has a glass transition temperature no greater than about 0° C.; and (b) a carboxylic acid-functional, ethylenically unsaturated co-monomer; and (B) a bis-amide crosslinking agent having the formula:

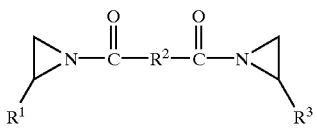

where $R^1$ and $R^3$ independently, are selected from the group consisting of H and $C_nH_{2n+1}$ where n is an integer ranging from 1 to 5, and $R^2$ is a divalent radical selected from the group consisting of benzeno ($-C_6H_4-$), substituted benzeno, triazine, $C_mH_{2m}$ where m is an integer ranging from 1 to 10, and combinations thereof, the relative amounts of said co-monomer and said crosslinking agent being selected such that (i) the ratio of the number of equivalents of amide groups to the number of equivalents of carboxylic acid groups is at least about 0.5, wherein the pressure sensitive adhesive composition comprises no greater than 10% by weight of a tackifier and no greater than 2% by weight of a plasticizer.

13. A process for protecting a substrate comprising:
    (A) applying an adhesive article to the substrate, said adhesive article comprising:
        (1) a backing; and
        (2) a pressure sensitive adhesive composition on said backing, said composition comprising the reaction product of:
            (a) a copolymer comprising the reaction product of (i) a (meth)acrylate ester of a non-tertiary alcohol in which the alkyl group contains between 1 and 8 carbon atoms, inclusive, and whose homopolymer has a glass transition temperature no greater than about 0° C.; and (ii) a carboxylic acid-functional, ethylenically unsaturated co-monomer; and
            (b) a bis-amide crosslinking agent having the formula:

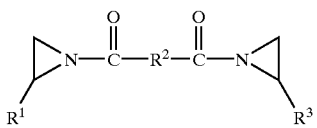

where $R^1$ and $R^3$ independently, are selected from the group consisting of H and $C_nH_{2n+1}$ where n is an integer ranging from 1 to 5, and $R^2$ is a divalent radical selected from the group consisting of benzeno ($-C_6H_4-$), substituted benzeno, triazine, $C_mH_{2m}$ where m is an integer ranging from 1 to 10, and combinations thereof,
            wherein the ratio of the number of equivalents of amide groups to the number of equivalents of carboxylic acid groups is at least about 0.5;
            wherein the pressure sensitive adhesive composition comprises no greater than 10% by weight of a tackifier and no greater than 2% by weight of a plasticizer;
    (B) heating said adhesive article and said substrate at a temperature within the range of about 150° C. to about 230° C.; and p1 (C) cleanly removing said adhesive article from said substrate following heat exposure.

14. A process according to claim 13 comprising heating said adhesive article and said substrate for at least about 30 minutes.

15. A process according to claim 13 wherein said substrate comprises a metal.

16. A process according to claim 15 wherein said substrate comprises copper.

17. A process according to claim 15 wherein said substrate comprises aluminum.

18. A process according to claim 13 wherein said substrate comprises glass.

19. A process according to claim 13 wherein said substrate comprises a polyimide.

20. A process according to claim 13 wherein said substrate comprises silicon.

21. A process according to claim 13 wherein said ratio is between about 0.5 and about 1.3, inclusive.

22. A process according to claim 13 wherein said ratio is between about 0.7 and about 1.0, inclusive.

23. A process according to claim 13 wherein said carboxylic acid-functional co-monomer is selected from the group consisting of acrylic acid, methacrylic acid, and combinations thereof.

24. A process according to claim 13 wherein said (meth) acrylate ester is selected from the group consisting of butyl acrylate, 2-methylbutyl acrylate, 2-ethyl hexyl acrylate, isooctyl acrylate, 4-methyl-2-pentyl acrylate, isoamyl acrylate, sec-butyl acrylate, and combinations thereof.

25. A process according to claim 13 wherein said (meth) acrylate ester is butyl acrylate.

26. A process according to claim 13 wherein said crosslinking agent comprises 1,1'-isophthaloyl-bis(2-methylaziridine).

27. A process according to claim 13 wherein the amount of said co-monomer is between about 1–5% by weight, inclusive, based upon the total weight of said copolymer.

28. A process according to claim 13 wherein the amount of said co-monomer is between about 1–2.5% by weight, inclusive, based upon the total weight of said copolymer.

29. A process according to claim 13 wherein the amount of said co-monomer is between about 1.5–2.5% by weight, inclusive, based upon the total weight of said copolymer.

30. The adhesive article of claim 1 wherein said composition, when applied to a copper-containing substrate at a thickness of 0.0008 inch and exposed to a temperature of 180° C. for 30 minutes, is cleanly removable following heat exposure.

31. The adhesive article of claim 1 wherein said composition, when applied to a glass substrate at a thickness of 0.0008 inch and exposed to a temperature of 180° C. for 30 minutes, is cleanly removable following heat exposure.

32. An adhesive article comprising:
    (1) a backing; and
    (2) a pressure sensitive adhesive composition on said backing, said composition comprising the reaction product of:
        (A) a copolymer comprising the reaction product of (a) a (meth)acrylate ester or a non-tertiary alcohol in which the alkyl group contains between 1 and 14 carbon atoms, inclusive, and whose homopolymer has a glass transition temperature no greater than about 0° C.; and (b) a carboxylic acid-functional, ethylenically unsaturated co-monomer; and (B) a bis-amide crosslinking agent having the formula:

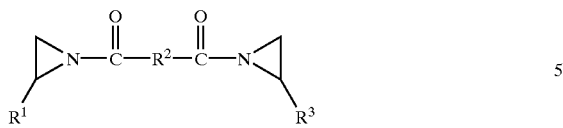

where $R^1$ and $R^3$ independently, are selected from the group consisting of H and $C_nH_{2n+1}$ where n is an integer ranging from 1 to 5, and $R^2$ is a divalent radical selected from the group consisting of benzeno ($—C_6H_4—$), substituted benzeno, triazine, $C_mH_{2m}$ where m is an integer ranging from 1 to 10, and combinations thereof, the relative amounts of said co-monomer and said crosslinking agent being selected such that (i) the ratio of the number of equivalents of amide groups to the number of equivalents of carboxylic acid groups is at least about 0.5, wherein the pressure sensitive adhesive composition comprises no greater than 10% by weight of a tackifier and no greater than 2% by weight of a plasticizer.

* * * * *

UNITED STATES PATENT AND TRADEMARK OFFICE
CERTIFICATE OF CORRECTION

PATENT NO. : 6,777,079 B2
APPLICATION NO. : 09/998935
DATED : August 17, 2004
INVENTOR(S) : Zhiming Zhou It is certified that error appears in the above-identified patent and that said Letters Patent is hereby corrected as shown below:

Column 14
Line 21, delete "centimeter" and insert -- $centimeter^2$ -- therefor.
Line 26, delete "centimeter" and insert -- $centimeter^2$ -- therefor.
Line 48, after "visually" insert -- inspected --.
Line 49, after "at" insert -- the edge --.
Line 52, after "results" insert -- are shown --.

Column 17
Line 63, in Claim 13, delete "p1".
Line 63, in Claim 13, delete "(C) cleanly removing said adhesive article from said substrate following heat exposure" and insert the same on line 64 as a new paragraph.

Signed and Sealed this

Twenty-eighth Day of November, 2006

JON W. DUDAS
*Director of the United States Patent and Trademark Office*